US010808604B2

(12) United States Patent
Sailer et al.

(10) Patent No.: US 10,808,604 B2
(45) Date of Patent: Oct. 20, 2020

(54) DRIVE SYSTEM FOR A MOTOR VEHICLE, AND MOTOR VEHICLE HAVING THE DRIVE SYSTEM

(71) Applicant: Bayerische Motoren Werke Aktiengesellschaft, Munich (DE)

(72) Inventors: Thomas Sailer, Pfaffenhofen a.d.Ilm (DE); Jan Velthuis, Landsberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/424,916

(22) Filed: May 29, 2019

(65) Prior Publication Data
US 2019/0277187 A1    Sep. 12, 2019

Related U.S. Application Data

(63) Continuation of application No. PCT/EP2017/078624, filed on Nov. 8, 2017.

(30) Foreign Application Priority Data

Nov. 30, 2016  (DE) .......................... 10 2016 223 730

(51) Int. Cl.
*F02B 37/007* (2006.01)
*F01N 13/00* (2010.01)
*F01N 3/021* (2006.01)
*F01N 3/10* (2006.01)
(Continued)

(52) U.S. Cl.
CPC ............ *F02B 37/007* (2013.01); *F01N 3/021* (2013.01); *F01N 3/10* (2013.01); *F01N 13/008* (2013.01);
(Continued)

(58) Field of Classification Search
CPC .... F02B 37/001; F02B 37/007; F02B 37/013; F02B 67/10; F02B 33/40; F01N 13/011;
(Continued)

(56) References Cited

U.S. PATENT DOCUMENTS

| 5,081,842 A * | 1/1992 | Sugiyama | ............. F02B 37/007 |
| | | | 60/600 |
| 2003/0106309 A1* | 6/2003 | Morimoto | ............. F01N 3/0231 |
| | | | 60/295 |

(Continued)

FOREIGN PATENT DOCUMENTS

| DE | 10 2008 020 745 A1 | 10/2009 |
| DE | 10 2008 052 170 A1 | 4/2010 |

(Continued)

OTHER PUBLICATIONS

International Search Report (PCT/ISA/210) issued in PCT Application No. PCT/EP2017/078624 dated Jan. 8, 2018 with English translation (six (6) pages).

(Continued)

*Primary Examiner* — Thai Ba Trieu
*Assistant Examiner* — Loren C Edwards
(74) *Attorney, Agent, or Firm* — Crowell & Moring LLP (57) ABSTRACT

A drive system for driving a motor vehicle is provided. The drive system includes a first turbocharger, a second turbocharger, and an internal combustion engine. The first turbocharger and the second turbocharger are, for the drive of the motor vehicle, operatively connected to the internal combustion engine. The first turbocharger and the second turbocharger are, in a height direction of a crankcase of the internal combustion engine, arranged one above the other in a defined corridor adjacent to the crankcase. The invention also provides a motor vehicle including the drive system.

18 Claims, 4 Drawing Sheets

(51) Int. Cl.
  *F01N 13/10* (2010.01)
  *F02B 37/00* (2006.01)
  *F02B 67/10* (2006.01)
  *F01N 13/18* (2010.01)
  *F02B 33/40* (2006.01)

(52) U.S. Cl.
  CPC .......... *F01N 13/011* (2014.06); *F01N 13/107* (2013.01); *F02B 37/001* (2013.01); *F02B 67/10* (2013.01); *F01N 13/1805* (2013.01); *F01N 2340/04* (2013.01); *F01N 2340/06* (2013.01); *F01N 2560/025* (2013.01); *F01N 2560/14* (2013.01); *F02B 33/40* (2013.01); *Y02A 50/2322* (2018.01); *Y02T 10/144* (2013.01)

(58) Field of Classification Search
  CPC .... F01N 13/008; F01N 13/009; F01N 13/107; F01N 13/1805; F01N 2340/04; F01N 2340/06; F01N 2560/025; F01N 2560/14; F01N 3/021; F01N 3/10; Y02A 50/2322; Y02T 10/144
  See application file for complete search history.

(56) References Cited

U.S. PATENT DOCUMENTS

| | | | |
|---|---|---|---|
| 2011/0185724 A1 | 8/2011 | Barth et al. | |
| 2011/0239630 A1* | 10/2011 | Bennet | F01N 3/021 60/280 |
| 2012/0000196 A1* | 1/2012 | Niwa | F02B 37/013 60/602 |
| 2012/0090320 A1 | 4/2012 | Kuhlbach et al. | |
| 2014/0026562 A1* | 1/2014 | Brueck | F01D 21/003 60/605.1 |
| 2014/0182289 A1* | 7/2014 | Kim | F02B 37/007 60/612 |

FOREIGN PATENT DOCUMENTS

| | | |
|---|---|---|
| DE | 10 2011 104 450 A1 | 1/2012 |
| DE | 10 2012 213 161 A1 | 1/2014 |
| EP | 0 171 624 A1 | 2/1986 |
| EP | 2 690 266 A1 | 1/2014 |
| GB | 2535537 A | 8/2016 |
| JP | 60-216030 A | 10/1985 |
| WO | WO 2006/095917 A1 | 9/2006 |

OTHER PUBLICATIONS

German-language Written Opinion (PCT/ISA/237) issued in PCT Application No. PCT/EP2017/078624 dated Jan. 8, 2018 (six(6) pages).

German-language Search Report issued in counterpart German Application No. 10 2016 223 730.6 dated Dec. 4, 2017 partial English translation (twelve (12) pages).

* cited by examiner

DRIVE SYSTEM FOR A MOTOR VEHICLE, AND MOTOR VEHICLE HAVING THE DRIVE SYSTEM

CROSS REFERENCE TO RELATED APPLICATIONS

This application is a continuation of PCT International Application No. PCT/EP2017/078624, filed Nov. 8, 2017, which claims priority under 35 U.S.C. § 119 from German Patent Application No. 10 2016 223 730.6, filed Nov. 30, 2016, the entire disclosures of which are herein expressly incorporated by reference.

BACKGROUND AND SUMMARY OF THE INVENTION

The present invention relates to a drive system for driving a motor vehicle including a first turbocharger, a second turbocharger and an internal combustion engine, the first turbocharger and the second turbocharger being operatively connected to the internal combustion engine to drive the motor vehicle. The invention additionally relates to a motor vehicle including such a drive system.

In the prior art, internal combustion engines comprising a supercharger group having two turbochargers and an exhaust after-treatment system are known. The two turbochargers are arranged horizontally side-by-side. The exhaust after-treatment system has exhaust after-treatment units such as catalytic converters and particle filters. The conventional arrangement of turbochargers and exhaust after-treatment units means that volumes required to meet the current and future emission standards for catalytic converters and particle filters cannot always be integrated close to the engine in the installation space available in the motor vehicle.

The particle filters are therefore frequently integrated in the underbody region of the motor vehicle. In this case, it is problematic that, depending on the power stage of the internal combustion engine and the available installation space in the underbody region of the motor vehicle, the cross-sectional area of the particle filter required to achieve the engine performance cannot be integrated. However, the engine performance is reduced as a result. In addition, as a result, for countries and/or regions with emissions standards, for the compliance with which a particle filter is required, an additional variant of the exhaust system is produced. Lastly, this results in an increase in costs for development, logistics, assembly and service.

A problem addressed by the present invention is that of remedying at least in part the above-described disadvantages in drive systems for a motor vehicle. In particular, the problem addressed by the present invention is that of providing a drive system and a motor vehicle comprising the drive system in which required emissions standards can be met in a simple, cost-effective and engine-efficient manner.

The above problem is solved by a drive system and/or a motor vehicle in accordance with embodiments of the invention. Further advantages of the invention can be found in the claims, the description and the drawings. In this case, features and details which are described in connection with the drive system naturally also apply in connection with the motor vehicle according to the invention and vice versa in each case, and therefore, with respect to the disclosure, reference is or can always be made mutually to the individual aspects of the invention.

According to a first aspect of the present invention, a drive system for driving a motor vehicle is provided. The drive system has a first turbocharger, a second turbocharger and an internal combustion engine, the first turbocharger and the second turbocharger being operatively connected to the internal combustion engine to drive the motor vehicle. The first turbocharger and the second turbocharger are arranged one above the other in a height direction of a crankcase of the internal combustion engine in a defined corridor next to the crankcase, in particular in a width direction laterally next to the crankcase.

In the context of the present invention, with respect to the turbocharger arrangement, a concept which is fundamentally novel has been followed, in which the turbochargers are arranged not horizontally side-by-side, as has been conventional until now, but rather vertically one above the other, that is to say installed in the motor vehicle horizontally one above the other. In this case, it has surprisingly become apparent that an arrangement of the turbochargers one above the other provides various advantages. As a result of the fact that the first turbocharger and the second turbocharger are arranged one above the other in the height direction of the crankcase or in the gravitational direction, it is possible to integrate exhaust after-treatment components, such as catalytic converters and/or particle filters, particularly close to the engine or the crankcase. Catalytic converters and/or particle filters can be arranged for example directly next to the crankcase, in particular next to a long side of the crankcase. Laterally next to the crank case, in a simple manner, larger cross-sectional areas than in an underbody region of a motor vehicle are possible for catalytic converters and/or particle filters. By way of large cross-sectional areas of the catalytic converters and/or particle filters, correspondingly effective exhaust after-treatment can be achieved. In this case, a plurality of catalytic converters and/or particle filters do not have to be arranged downstream of the turbochargers. The exhaust gas flows from the at least two turbochargers can also be guided in a single flow through only one catalytic converter and/or one particle filter.

As a result of the ability to provide large catalytic converters and/or particle filters for the exhaust after-treatment in a simple and inexpensive manner, these can also be installed by way of precaution in motor vehicles for countries in which emissions standards could also be met with smaller catalytic converters and/or particle filters. As a result, there is no need for different exhaust system variants for different countries and/or regions. This results in a reduction in the logistics expenditure, whereby costs can be saved overall.

Another advantage of the arrangement according to the invention of the turbochargers is that the air-guiding components for guiding the clean air and charge air can be arranged on the internal combustion engine or on the crankcase in such a way that said air does not have to, or hardly has to cross the hot, exhaust-gas-conducting components such as the exhaust manifolds, the turbochargers, the catalytic converters and/or the particle filters. As a result, a heat input from the exhaust system into the fresh air of the air intake system can be prevented or reduced.

Furthermore, as a result of the present arrangement of the turbochargers, interfaces to clean air lines to the charge air ducts are preferably located at the same level. As a result, particularly short clean air guides which are almost the same length can be provided on the intake side of the compressor, and charge air ducts can be provided on the discharge side of the compressor. This brings about advantageous airflow behavior inside the drive system. In addition, in the case of a system according to the invention, there is no need for an entrance funnel into the catalytic converter or converters. As a result, the weight and costs can be reduced. Moreover, the available installation space can be used more effectively.

In the present case, the internal combustion engine is understood to mean in particular a unit which comprises the crankcase or the engine block, cylinders, pistons, connecting rods, inlet and outlet valves and a crankshaft.

The first turbocharger and the second turbocharger each have a turbine and a compressor which are interconnected in a known manner. Accordingly, in the present case, a first compressor and a first turbine of the first turbocharger and a second compressor and a second turbine of the second turbocharger are each arranged one above the other in the height direction of the crankcase of the internal combustion engine in the defined corridor next to the crankcase.

The defined corridor can be understood to be a restricted space which extends next to the crankcase, in particular next to a long side of the crankcase, preferably parallel or substantially parallel to the crankcase or to the height direction of the crankcase.

The height direction of the crankcase is understood to mean a direction from a lower face of the crankcase to an upper face of the crankcase. The upper face of the crankcase is a side in which the cylinder openings are positioned. The crankcase further has a front end face and a rear end face. In the region of the front end face, in particular in front of the front end face, the clean air and charge air lines are directed. Furthermore, the crankcase has two long sides which are located between the front end face and the rear end face or between the upper face and the lower face. The upper face, the lower face, the front end face, the rear end face and the two long sides are understood to mean in each case lateral regions of the crankcase which are not to be considered to be restricted to a straight lateral face.

The height direction is understood to mean in particular a direction from the lower face of the crankcase to the upper face of the crankcase orthogonally or substantially orthogonally to the lower face and/or to the upper face. Instead of the lower face or the upper face, in this regard, in each case one auxiliary plane is to be considered, to which the height direction extends orthogonally or substantially orthogonally.

In this case, the height direction is not restricted to the crankcase. That is to say that although the first turbocharger and the second turbocharger are arranged one above the other in the height direction, said turbochargers are arranged offset from the crankcase.

According to one development of the present invention, it is possible for the first turbocharger and the second turbocharger to be arranged directly or substantially directly one above the other in an arrangement direction which extends parallel or at an acute angle to the height direction of the crankcase. As a result, the turbochargers can be arranged next to the crankcase in a particularly compact manner. Consequently, catalytic converters and/or particle filters can also be arranged downstream of the turbochargers or the respective turbines in a compact manner directly after the turbines and thus also next to the crankcase or next to a long side of the crankcase. The first turbocharger and the second turbocharger are arranged along the arrangement direction, preferably parallel or at an acute angle of between 0° and 30° to the height direction of the crankcase. In this case, the height direction extends preferably orthogonally or substantially orthogonally to the auxiliary plane already described above, which plane corresponds to the lower face and/or the upper face of the crankcase.

According to the invention, it can also be advantageous, in the case of a drive system, for the first turbocharger and the second turbocharger to be arranged in a width direction of the crankcase next to the crankcase, in particular at a height of the crankcase. As a result, the available space in an engine compartment in the motor vehicle can be used efficiently. The fact that the first turbocharger and the second turbocharger are arranged in a width direction of the crankcase next to the crankcase at a height of the crankcase is to be understood to mean that the first turbocharger and the second turbocharger are arranged in a projection of the crankcase in the width direction of the crankcase between the lower face of the crankcase and the upper face of the crankcase.

In the context of the present invention, it is further advantageous for the first turbocharger and the second turbocharger to be arranged next to a front region of the crankcase, preferably next to a region of the front third of the crankcase, an exhaust gas flow direction extending from the front region of the crankcase to a rear region of the crankcase. As a result, next to the crankcase and thus in the engine compartment of the motor vehicle, there is still sufficient space to arrange catalytic converters and particle filters downstream of the turbochargers or the turbines of the turbochargers likewise next to the crankcase. Consequently, it is possible to provide a particularly compact drive system in which large catalytic converter and particle filter cross sections are still possible.

Furthermore, it is possible, in the case of a drive system according to the present invention, for a first exhaust manifold to be provided with a first exhaust inlet for letting exhaust gas from the internal combustion engine into the first exhaust manifold, and a second exhaust manifold to be provided with a second exhaust inlet for letting exhaust gas from the internal combustion engine into the second exhaust manifold. The first exhaust manifold is configured and arranged in such a way that exhaust gas is conducted from the first exhaust inlet to the first turbocharger firstly in a first height direction or substantially in a first height direction of the crankcase. The second exhaust manifold is configured and arranged in such a way that exhaust gas is conducted from the second exhaust inlet to the second turbocharger firstly in a second height direction or substantially in a second height direction of the crankcase, the first height direction extending oppositely to the second height direction. That is to say that the first exhaust manifold is firstly guided downwards in the first height direction or in the gravitational direction, and the second exhaust manifold is firstly guided upwards in the second height direction or oppositely to the gravitational direction. As a result, it is possible to achieve a relatively large cross-sectional area of the catalytic converters and/or the particle filters close to the engine or close to the crankcase in the height direction.

In the case of a drive system according to the invention, it is further possible for the first turbocharger to have a first turbine housing, and for the second turbocharger to have a second turbine housing, a first lambda probe being arranged in the first turbine housing, and a second lambda probe being arranged in the second turbine housing. By arranging the lambda probes directly in the turbine housings, the available installation space or the engine compartment in the motor vehicle can be used in a particularly advantageous manner.

It can also be advantageous, in the case of a drive system from the present invention, in a drive system, for at least one catalytic converter to be arranged downstream of the first turbocharger or the first turbine of the first turbocharger and downstream of the second turbocharger or the second turbine of the second turbocharger, and for at least one particle filter to be arranged downstream of the at least one catalytic converter, at least one monitoring probe being arranged in the drive system downstream of the at least one catalytic converter and upstream of the at least one particle filter. Also as a result, the available installation space or the engine compartment in the motor vehicle can be used in a particularly advantageous manner. That is to say that the drive system can have a particularly compact construction and can accordingly be arranged in the engine compartment of the motor vehicle in a compact manner.

According to another configuration variant of the present invention, it is possible for at least one catalytic converter to be arranged in the drive system downstream of the first turbocharger and downstream of the second turbocharger, at least one expansion compensation member, for compensating for movements and/or deformations of the first turbocharger and/or of the second turbocharger in the drive system, being attached to the first turbocharger and/or to the second turbocharger and being movably arranged on the at least one catalytic converter. By way of the expansion compensation member arranged according to the invention, a movement and deformation compensation in the longitudinal direction of the internal combustion engine or the crankcase can be made possible in an effective manner. The fact that the expansion compensation member is attached to the first turbocharger and/or to the second turbocharger can be understood to mean that the expansion compensation member is fixed to the first turbocharger and/or to the second turbocharger.

Furthermore, it is possible, in the case of a drive system according to the invention, in the drive system, for at least one catalytic converter to be arranged downstream of the first turbocharger and downstream of the second turbocharger, and for at least one particle filter to be arranged downstream of the at least one catalytic converter, the at least one catalytic converter and/or the at least one particle filter being arranged in a width direction of the crankcase next to the crankcase in the drive system in a longitudinal direction of the crankcase over a crankcase length of between approx. 40% and 80%, preferably between approx. 50% and 70%. A compact construction of this type can be achieved in particular by the essential arrangement of the two turbochargers. The region of the crankcase or the crankcase length over which the at least one catalytic converter and the at least one particle filter are or can be arranged next to the crankcase depends on the design of the crankcase. In the case of a crankcase comprising four cylinders, the at least one catalytic converter and the at least one particle filter naturally occupy more space next to the crankcase, on a percentage basis, than those in the case of a crankcase comprising six cylinders. The decisive factor is that neither the at least one catalytic converter nor the at least one particle filter is arranged in the width direction of the crankcase next to the crankcase and, in the longitudinal direction of the crankcase, in a projection of the crankcase, neither protrudes beyond one of the end faces of the crankcase. The drive system can be arranged in a correspondingly compact manner in the engine compartment of the motor vehicle.

According to another aspect of the present invention, a motor vehicle comprising a drive system as described in detail above is provided, the first turbocharger and the second turbocharger being arranged one above the other in an engine compartment of the motor vehicle in the height direction of the crankcase of the internal combustion engine in the defined corridor next to the crankcase. The motor vehicle according to the invention thus provides the same advantages as have been described in detail with reference to the drive system according to the invention. The engine compartment is to be understood to mean a region in the motor vehicle which is provided in the motor vehicle in particular for the internal combustion engine and additional units for operating the internal combustion engine which are arranged close to or directly on the internal combustion engine. In the present case, the engine compartment is not understood to mean the underbody or a region in the underbody of the motor vehicle.

Additional measures which improve the invention can be found in the following description of various exemplary embodiments of the invention which are shown schematically in the drawings. All the features and/or advantages disclosed in the claims, the description or the drawings, including design details and spatial arrangements, can be essential to the invention per se and in the various combinations thereof.

Other objects, advantages and novel features of the present invention will become apparent from the following detailed description of one or more preferred embodiments when considered in conjunction with the accompanying drawings.

Elements having the same function and effect are provided in each case with the same reference signs in FIGS. 1 to 6.

DETAILED DESCRIPTION OF THE DRAWINGS

Figure 1:
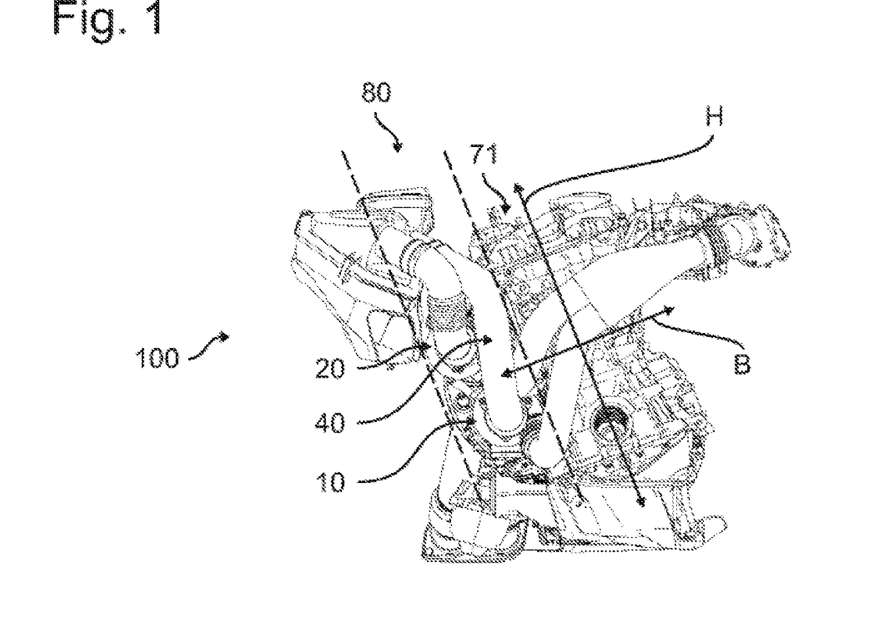
FIG. 1 is a schematic front view of a drive system according to the invention.

FIG. 1 is a front view of a drive system 100 for driving a motor vehicle 1000. The drive system 100 has a first turbocharger 10, a second turbocharger 20 and an internal combustion engine 70 having a crankcase 71. The first turbocharger 10 and the second turbocharger 20 are operatively connected to the internal combustion engine 70 to drive the motor vehicle 1000. In FIG. 1, it can be seen that the first turbocharger 10 and the second turbocharger 20 are arranged one above the other in a height direction H of the crankcase 71 in a defined corridor 80 next to the crankcase 71.

As shown in FIG. 1, the first turbocharger 10 and the second turbocharger 20 are arranged directly one above the other in an arrangement direction which extends at an acute angle or approximately parallel to the height direction H of the crankcase 71. The first turbocharger 10 and the second turbocharger 20 are additionally arranged in a width direction B of the crankcase 71 next to the crankcase 71 at a height of the crankcase 71.

FIG. 1 additionally shows the air intake system 40 of the drive system 100. As can clearly be seen in FIG. 1, the clean air and charge air lines extend side-by-side and do not or hardly cross one another. In addition, the relatively short pipe lengths and the small deflections can be found in the embodiment shown and are made possible by the arrangement of the turbochargers 10, 20 according to the invention.

Figure 2:
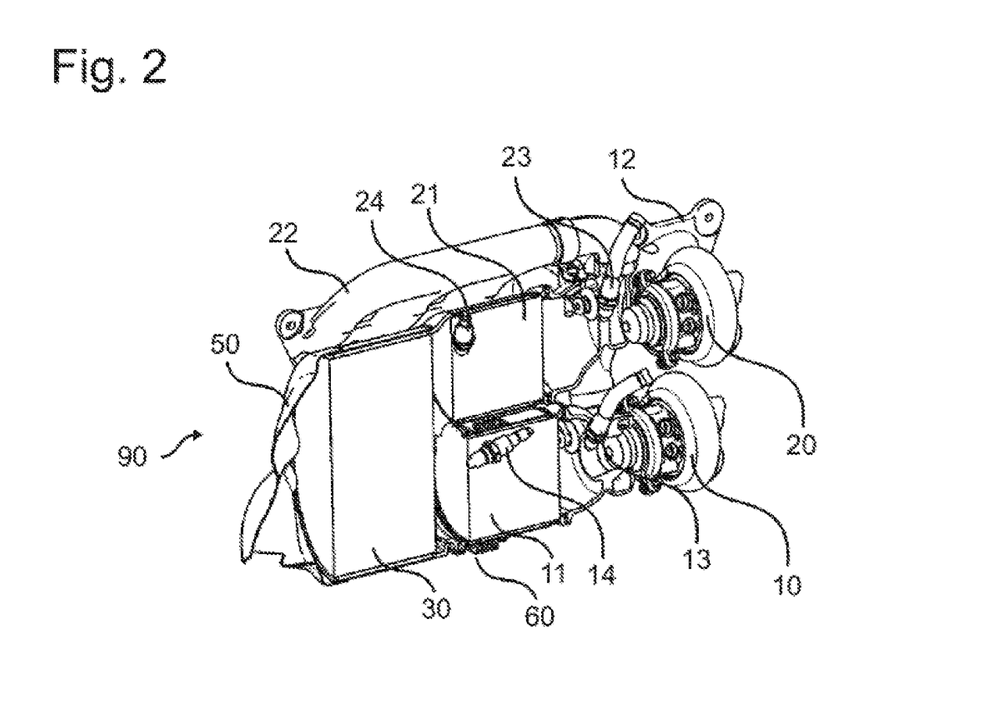
FIG. 2 is a schematic, perspective, sectional view illustrating a drive system according to the invention.

FIG. 2 is a sectional, perspective view of an exhaust system 90 of the drive system 100. The exhaust system 90 has a first exhaust manifold 12 and a second exhaust manifold 22. As shown in FIG. 2, a first catalytic converter 11 is arranged downstream of the first turbocharger 10 or of a first turbine of the first turbocharger 10. A second catalytic converter 21 is arranged downstream of the second turbocharger 20 or the second turbine of the second turbocharger 20. A particle filter 30 is arranged downstream of the first catalytic converter 11 and the second catalytic converter 21. An outlet funnel 50 is positioned downstream of the particle filter 30.

In the exhaust system 90, a first lambda probe 13 is arranged in a first turbine housing 15, and a second lambda probe 23 is arranged in a second turbine housing 25. In addition, the exhaust system 90 has a first monitoring probe 14 and a second monitoring probe 24, the first monitoring probe 14 being arranged downstream of the first catalytic converter 11 and upstream of the particle filter 30, and the second monitoring probe 24 being arranged downstream of the second catalytic converter 21 and upstream of the particle filter 30.

An expansion compensation member 60 for compensating for movements and/or deformations of the first turbocharger 10 and the second turbocharger 20 is attached to the first turbocharger 10 and to the second turbocharger 20 and movably arranged on the first catalytic converter 11 and the second catalytic converter 21 in the exhaust system 90 shown.

Figure 3:
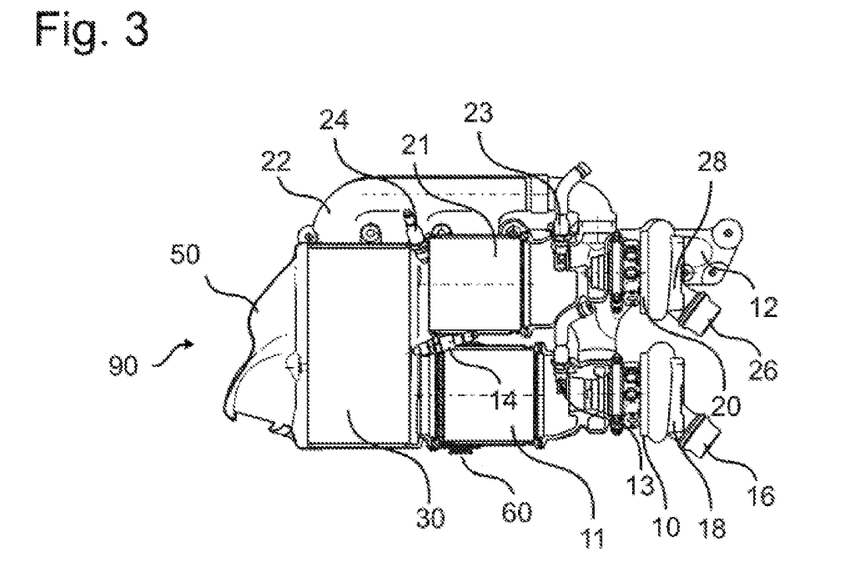
FIG. 3 is a schematic, sectional side view of the drive system according to the invention.

FIG. 3 is a sectional side view of the exhaust system 90 shown in FIG. 2. As can be seen in FIG. 3, the interfaces of a first charge air supply 16 and a second charge air supply 26 and of a first clean air line 18 and a second clean air line 28 are each located at the same level.

Figure 4:
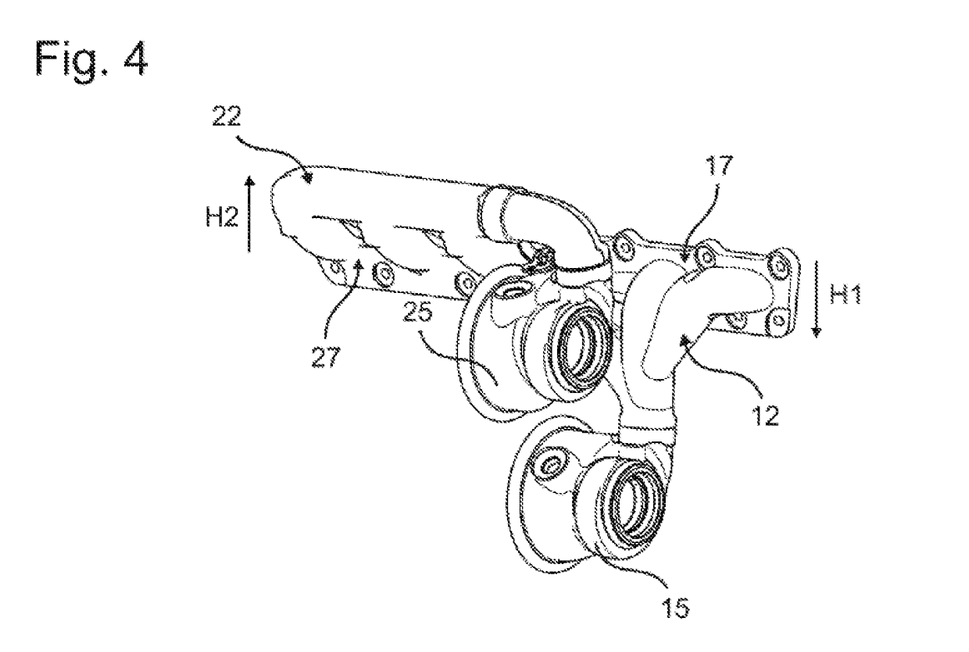
FIG. 4 is a schematic, perspective view of an exhaust gas system from the present invention.

FIG. 4 shows exhaust ducts and casings of the exhaust system 90. FIG. 4 shows the first turbine housing 15 for the first turbocharger 10 and the second turbine housing 25 for the second turbocharger 20. From FIG. 4, it can additionally be seen that the first exhaust manifold 12 is provided with a first exhaust inlet 17 for letting exhaust gas from the internal combustion engine 70 into the first exhaust manifold 12, and a second exhaust manifold 22 is provided with a second exhaust inlet 27 for letting exhaust gas from the internal combustion engine 70 into the second exhaust manifold 22. The first exhaust manifold 12 is configured in such a way that exhaust gas is firstly conducted in a first height direction H1 of the crankcase 71 from the first exhaust inlet 17 to the first turbocharger 10. The second exhaust manifold 22 is configured in such a way that exhaust gas is firstly conducted in a second height direction H2 of the crankcase 71 from the second exhaust inlet 27 to the second turbocharger 20. The first height direction H1 extends oppositely to the second height direction H2.

Figure 5:
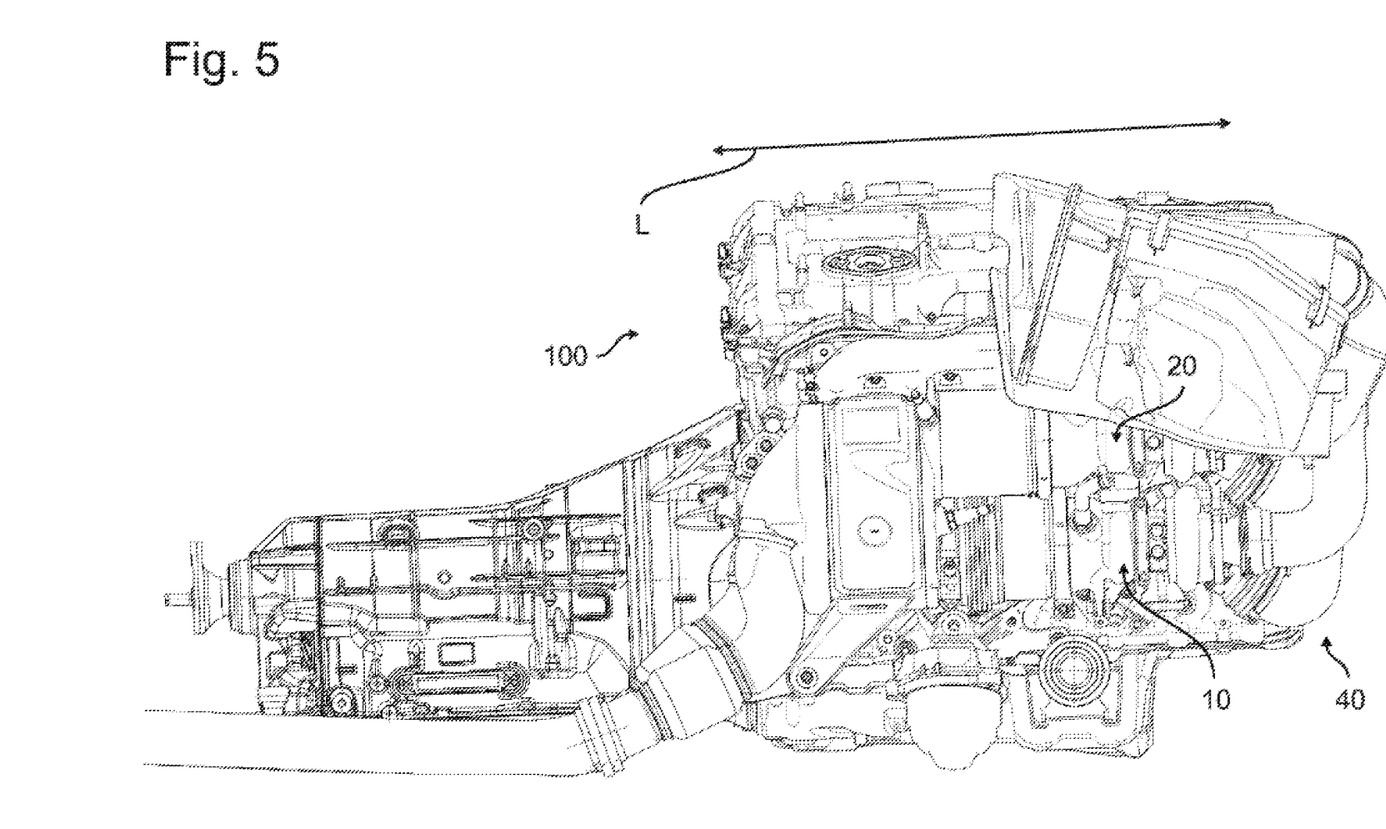
FIG. 5 is a schematic side view of a drive system according to the invention.

FIG. 5 is a side view of the above-described drive system 100. FIG. 5 shows that the two catalytic converters 11, 21 and the particle filter 30 are arranged in the width direction B of the crankcase 71 next to the crankcase 71 in a longitudinal direction L of the crankcase 71 over only approx. 40% of the crankcase length. In addition, FIG. 5 shows that the first turbocharger 10 and the second turbocharger 20 are arranged next to a region of the front third of the crankcase 71.

Figure 6:
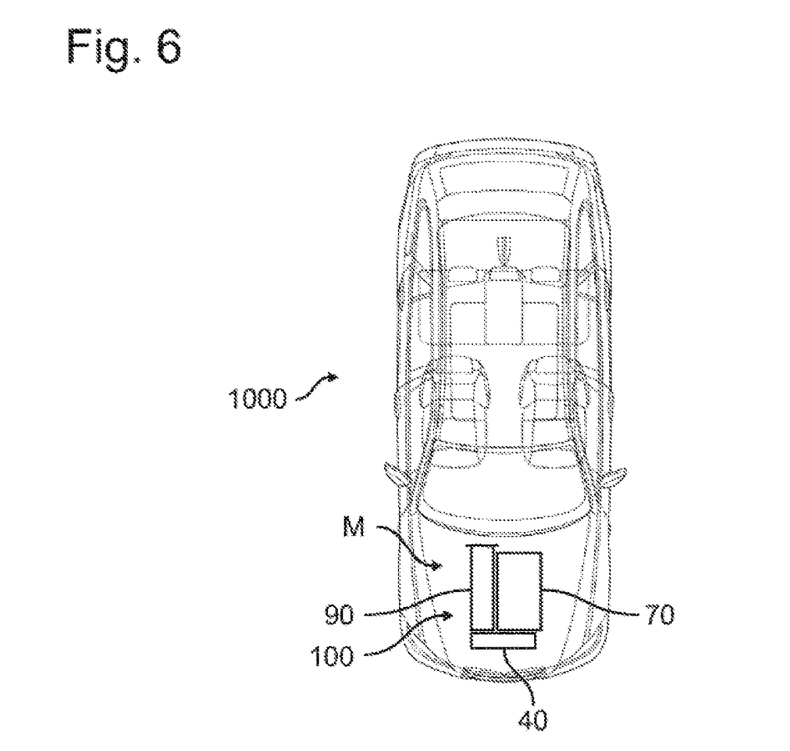
FIG. 6 shows a motor vehicle comprising a drive system according to one embodiment of the present invention.

FIG. 6 shows a motor vehicle 1000 comprising the drive system 100 described in detail above. In the motor vehicle 1000 shown, the first turbocharger 10, the second turbocharger 20, the catalytic converters 11, 21 and the particle filter 30 are arranged inside the exhaust system 90 in an engine compartment M of the motor vehicle 1000.

LIST OF REFERENCE SIGNS 10 first turbocharger
11 first catalytic converter
12 first exhaust manifold
13 first lambda probe
14 first monitoring probe
15 first turbine housing
16 first charge air supply
17 first exhaust inlet
18 first clean air line
20 second turbocharger
21 second catalytic converter
22 second exhaust manifold
23 second lambda probe
24 second monitoring probe
25 second turbine housing
26 second charge air supply
27 second exhaust inlet
28 second clean air line
30 particle filter
40 air intake system
50 outlet funnel
60 expansion compensation member
70 internal combustion engine
71 crankcase
80 corridor
90 exhaust system
100 drive system
B width direction
H height direction
H1 first height direction
H2 second height direction
L longitudinal direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A drive system for driving a motor vehicle comprising:
a first turbocharger;
a second turbocharger; and
an internal combustion engine,
wherein the first turbocharger and the second turbocharger are operatively connected to the internal combustion engine to drive the motor vehicle, and the first turbocharger and the second turbocharger are arranged one above the other in a height direction of a crankcase of the internal combustion engine in a defined corridor next to the crankcase;
wherein the first turbocharger and the second turbocharger are at least partially arranged within a height of the crankcase.
2. The drive system according to claim 1, wherein the first turbocharger and the second turbocharger are arranged directly or substantially directly one above the other in an arrangement direction which extends parallel or at an acute angle between 0° and 30° to the height direction of the crankcase.

3. The drive system according to claim 2, wherein
a first exhaust manifold is provided with a first exhaust inlet, and
a second exhaust manifold is provided with a second exhaust inlet, where the first exhaust manifold is configured and arranged to connect the first exhaust inlet to the first turbocharger firstly in a first height direction or substantially in the first height direction of the crankcase, and the second exhaust manifold is configured and arranged to connect the second exhaust inlet to the second turbocharger firstly in a second height direction or substantially in the second height direction of the crankcase, the first height direction extending oppositely to the second height direction.

4. The drive system according to claim 1, wherein the first turbocharger and the second turbocharger are arranged in a width direction of the crankcase, next to the crankcase.

5. The drive system according to claim 1, wherein the first turbocharger and the second turbocharger are arranged next to a front region of the crankcase.

6. The drive system according to claim 5, wherein the first turbocharger and the second turbocharger are arranged in an exhaust gas flow direction extending from the front region of the crankcase to a rear region of the crankcase.

7. The drive system according to claim 5, wherein
a first exhaust manifold is provided with a first exhaust inlet, and
a second exhaust manifold is provided with a second exhaust, where the first exhaust manifold is configured and arranged to connect first exhaust inlet to the first turbocharger firstly in a first height direction or substantially in the first height direction of the crankcase, and the second exhaust manifold is configured and arranged to connect the second exhaust inlet to the second turbocharger firstly in a second height direction or substantially in the second height direction of the crankcase, the first height direction extending oppositely to the second height direction.

8. The drive system according to claim 1, wherein
a first exhaust manifold is provided with a first exhaust inlet, and
a second exhaust manifold is provided with a second exhaust inlet at a substantially same height as the first exhaust inlet, where the first exhaust manifold is configured and arranged to connect the first exhaust inlet to the first turbocharger firstly in a first height direction or substantially in the first height direction of the crankcase, and the second exhaust manifold is configured and arranged to connect the second exhaust inlet to the second turbocharger firstly in a second height direction or substantially in the second height direction of the crankcase, the first height direction extending oppositely to the second height direction.

9. The drive system according to claim 8, wherein
the first turbocharger has a first turbine housing, and the second turbocharger has a second turbine housing, and
a first lambda probe is arranged in the first turbine housing, and a second lambda probe is arranged in the second turbine housing.

10. The drive system according to claim 8, wherein
downstream of the first turbocharger, at least one catalytic converter is arranged, and downstream of the at least one catalytic converter, at least one particle filter is arranged in the drive system, and
at least one monitoring probe is arranged in the drive system downstream of the at least one catalytic converter and upstream of the at least one particle filter.

11. The drive system according to claim 8, wherein
at least one catalytic converter is arranged in the drive system downstream of the first turbocharger and downstream of the second turbocharger, and
an expansion compensation member attached to the first turbocharger and/or to the second turbocharger and movably arranged on the at least one catalytic converter.

12. The drive system according to claim 1, wherein
a first exhaust manifold is provided with a first exhaust inlet, and
a second exhaust manifold is provided with a second exhaust inlet, where the first exhaust manifold is configured and arranged to connect the first exhaust inlet to the first turbocharger firstly in a first height direction or substantially in the first height direction of the crankcase, and the second exhaust manifold is configured and arranged to connect the second exhaust inlet to the second turbocharger firstly in a second height direction or substantially in the second height direction of the crankcase, the first height direction extending oppositely to the second height direction.

13. The drive system according to claim 1, wherein
the first turbocharger has a first turbine housing, and the second turbocharger has a second turbine housing, and
a first lambda probe is arranged in the first turbine housing, and a second lambda probe is arranged in the second turbine housing.

14. The drive system according to claim 1, wherein
downstream of the first turbocharger, at least one catalytic converter is arranged, and downstream of the at least one catalytic converter, at least one particle filter is arranged in the drive system, and
at least one monitoring probe is arranged in the drive system downstream of the at least one catalytic converter and upstream of the at least one particle filter, wherein
one or more of the at least one catalytic converter and the at least one particle filter are arranged at least partially within the defined corridor.

15. The drive system according to claim 1, wherein
at least one catalytic converter is arranged in the drive system downstream of the first turbocharger and downstream of the second turbocharger, and
an expansion compensation member attached to the first turbocharger and/or to the second turbocharger and movably arranged on the at least one catalytic converter.

16. The drive system according to claim 1, wherein
in the drive system, at least one catalytic converter is arranged downstream of the first turbocharger and downstream of the second turbocharger, and at least one particle filter is arranged downstream of the at least one catalytic converter, and
the at least one catalytic converter and/or the at least one particle filter are/is arranged next to the crankcase in the width direction of the crankcase and span a length of the crankcase in a longitudinal direction between approximately 40% and 80%.

17. The drive system according to claim 16, wherein the at least one catalytic converter and/or the at least one particle filter are/is arranged next to the crankcase in the width direction of the crankcase and span the length of the crankcase in the longitudinal direction between approximately 50% and 70%.

18. A motor vehicle comprising:
a drive system according to claim 1, wherein
the first turbocharger and the second turbocharger are arranged one above the other in an engine compartment of the motor vehicle in the height direction of the crankcase of the internal combustion engine in the defined corridor next to the crankcase.

\* \* \* \* \*